United States Patent
Park et al.

(10) Patent No.: US 12,485,806 B2
(45) Date of Patent: Dec. 2, 2025

(54) PARTITION WALL WITH TABLE FUNCTION FOR DELIVERY VEHICLE

(71) Applicant: HYUNDAI MOBIS CO., LTD., Seoul (KR)

(72) Inventors: Jae Whoan Park, Yongin-si (KR); Seung Cheol Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 220 days.

(21) Appl. No.: 18/238,166

(22) Filed: Aug. 25, 2023

(65) Prior Publication Data
US 2024/0190319 A1  Jun. 13, 2024

(30) Foreign Application Priority Data
Dec. 13, 2022 (KR) .......................... 10-2022-0173708

(51) Int. Cl.
*B60N 3/00* (2006.01)

(52) U.S. Cl.
CPC .................................. *B60N 3/001* (2013.01)

(58) Field of Classification Search
CPC ........ B60N 3/001; B60N 2/206; B60R 5/003; B60R 2011/0019; B60R 3011/0082; B64D 11/0638; B64D 11/0605; A47B 46/00; A47B 5/006; A47B 96/025; A47C 7/624; A47C 7/70; D06F 81/06
USPC ....... 108/44, 42, 140, 137, 139, 143, 39, 99; 297/143, 150, 147, 161; 312/322
See application file for complete search history.

(56) References Cited

U.S. PATENT DOCUMENTS

| | | | | |
|---|---|---|---|---|
| 2,680,314 A | * | 6/1954 | Snyder | D06F 81/06 108/140 |
| 4,995,681 A | * | 2/1991 | Parnell | A47B 77/10 38/103 |
| 5,547,247 A | * | 8/1996 | Dixon | A47C 7/70 297/145 |
| 6,206,495 B1 | * | 3/2001 | Peterson | A47B 46/00 312/283 |
| 6,692,051 B1 | * | 2/2004 | Cook | B60N 2/24 296/24.39 |
| 7,798,072 B2 | * | 9/2010 | Becker | A47C 7/70 297/145 |
| 7,963,231 B2 | * | 6/2011 | Osborne | A47B 5/006 108/42 |

(Continued)

FOREIGN PATENT DOCUMENTS

| | | | |
|---|---|---|---|
| CN | 2937204 Y | * | 8/2007 |
| CN | 203113131 U | * | 8/2013 |

(Continued)

*Primary Examiner* — Janet M Wilkens
(74) *Attorney, Agent, or Firm* — MORGAN, LEWIS & BOCKIUS LLP (57) ABSTRACT

A partition wall with a table function for a delivery vehicle includes: a fixing frame mounted on a rear panel of a cockpit in a space with a front passenger seat removed; a first folding board rotatably connected to the fixing frame and provided to be folded or unfolded toward the fixing frame; a second folding board disposed on the first folding board in a state in which the first folding board is unfolded, and rotatably connected to the first folding board; and a third folding board rotatably connected to an end portion of the second folding board and provided to be folded or unfolded toward the second folding board.

11 Claims, 10 Drawing Sheets

(56) References Cited

U.S. PATENT DOCUMENTS

| | | | | |
|---|---|---|---|---|
| 2006/0220425 A1* | 10/2006 | Becker | A47C 7/70 | |
| | | | 297/188.16 | |
| 2009/0058152 A1* | 3/2009 | Orlo | B60N 2/206 | |
| | | | 297/163 | |
| 2010/0257762 A1* | 10/2010 | Elizondo, Jr. | D06F 81/06 | |
| | | | 38/137 | |
| 2011/0287815 A1* | 11/2011 | Liang | H04M 1/0227 | |
| | | | 455/575.1 | |
| 2019/0061954 A1* | 2/2019 | Miedema | B60N 3/002 | |
| 2022/0135230 A1* | 5/2022 | Satterfield | B64D 11/0606 | |
| | | | 108/44 | |
| 2023/0294583 A1* | 9/2023 | Silverwood | B60N 2/62 | |
| | | | 297/147 | |
| 2024/0349894 A1* | 10/2024 | Solterbeck | A47B 96/025 | |

FOREIGN PATENT DOCUMENTS

| | | | | | |
|---|---|---|---|---|---|
| CN | 104562620 | A | * | 4/2015 | D06F 81/06 |
| EP | 1836927 | A1 | * | 9/2007 | A47B 5/006 |
| GB | 2552582 | A | * | 1/2018 | B60N 2/01 |
| KR | 20130055484 | A | * | 5/2013 | |
| KR | 20140005150 | U | * | 10/2014 | |
| WO | WO-2018092086 | A1 | * | 5/2018 | A47B 13/088 |

* cited by examiner

FIG. 8

PARTITION WALL WITH TABLE FUNCTION FOR DELIVERY VEHICLE

CROSS-REFERENCE TO RELATED APPLICATION

This application claims priority to and the benefit of Korean Patent Application No. 10-2022-0173708, filed on Dec. 13, 2022, in the Korean Intellectual Property Office, the disclosure of which is incorporated herein by reference in its entirety.

BACKGROUND

1. Field of the Invention

The present disclosure relates to a partition wall for a delivery vehicle, and more particularly, to a partition wall with a table function for a delivery vehicle providing convenience of use to a driver by giving the table function using the partition wall.

2. Discussion of Related Art

Recently, there are many ongoing developments of purpose-built vehicles (PBVs) for various purposes such as delivery, sales, and the like by diversifying the interior spaces of compact/small vehicles.

In these vehicles, a front passenger seat is often removed to maximize the overall loading space of a vehicle, and herein, a partition wall is installed between the loading space and a driver to prevent luggage from spilling over into the driver.

Meanwhile, delivery workers often perform various tasks including eating and the like in addition to delivery in vehicles, and in this case, a table may be an important convenient component for them.

However, since an existing partition wall is installed in a fixed structure, its removal is cumbersome and not easy, and there is a consequential problem that adjustment according to a size of luggage is impossible. That is, only luggage with a size smaller than the size of the space provided by the partition wall may be loaded.

In addition, due to the partition wall, a removable-type table is difficult and cumbersome to install, and an area of the table is also narrow.

Therefore, the improvement thereof is required.

SUMMARY OF THE INVENTION

The present disclosure is directed to providing a partition wall with a table function for a delivery vehicle capable of loading luggage with various sizes in a front passenger seat space by configuring the partition wall installed in the front passenger seat space in a foldable structure and providing convenience of use to a driver by giving the table function.

The objects of the present disclosure are not limited to the above-mentioned objects, and other objects not mentioned will be clearly understood by those skilled in the art from the following description.

According to an aspect of the present disclosure, there is provided a partition wall with a table function for a delivery vehicle including: a fixing frame mounted on a rear panel of a cockpit in a space with a front passenger seat removed; a first folding board rotatably connected to the fixing frame and provided to be folded or unfolded toward the fixing frame; a second folding board disposed on the first folding board in a state, in which the first folding board is unfolded, and rotatably connected to the first folding board; and a third folding board rotatably connected to an end portion of the second folding board and provided to be folded or unfolded toward the second folding board.

The partition wall may further include a bridge frame provided to be movable forward and backward below the second folding board and a withdrawal spring with one side connected to the third folding board and the other side connected to a fore-end portion of the bridge frame, and the bridge frame may slide forward on the second folding board by the withdrawal spring as the third folding board is unfolded so that the fore-end portion may be disposed below the third folding board.

The second folding board may include an upper plate and a lower plate forming an inner space between the lower plate and the upper plate, and the bridge frame may be held in the inner space in a state in which the third folding board is folded, and the fore-end portion moving forward in the inner space may support the third folding board in a state in which the third folding board is unfolded.

The lower plate may have a rotation shaft connected through the first folding board in a state in which the lower plate is placed on an upper surface of the first folding board.

The lower plate may have a guide pin protruding toward the first folding board at a location spaced apart from the rotation shaft, a guide hole with a radius being a distance from the rotation shaft to the guide pin may be formed in a partial circular shape in the first folding board, and the guide pin may be configured to move along a rotation trajectory provided by the guide hole when the second folding board rotates about the rotation shaft with the guide pin inserted into the guide hole.

Fixing projections to which the guide pin is hooked and fixed may protrude and be formed at both ends of the guide hole.

The upper plate may have a rib protruding toward the lower plate on a lower surface, and an opening that the bridge frame penetrates may be formed in the rib to guide a sliding movement of the bridge frame.

The partition wall may further include connection hinges connecting the second folding board and the third folding board to be rotatable with each other, and each of the connection hinges may be connected to the second folding board and the third folding board at both edges in a width direction of the second folding board and the third folding board.

The fixing frame may include a body fixed to the rear panel and a pair of side walls bent at both ends of the body and extending toward the space, a hinge hole to which a hinge shaft of the first folding board is connected may be formed in the side walls, and a stopper restricting a rotation range of the first folding board may be provided to protrude on an inner surface of each of the body and the side walls.

The first folding board may have a pair of supports extending longitudinally from both edges in a width direction, and when the first folding board rotates about the hinge shaft, the supports may be obstructed by the stopper provided on each of the body and the side walls so that the first folding board may maintain a folding state and an unfolding state.

A distance from the hinge shaft to an end of each of the supports may be shorter than a distance from the hinge hole to the body.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings, but the same or corresponding components are assigned the same reference numbers even in different drawings and are not redundantly described herein.

Figure 1:
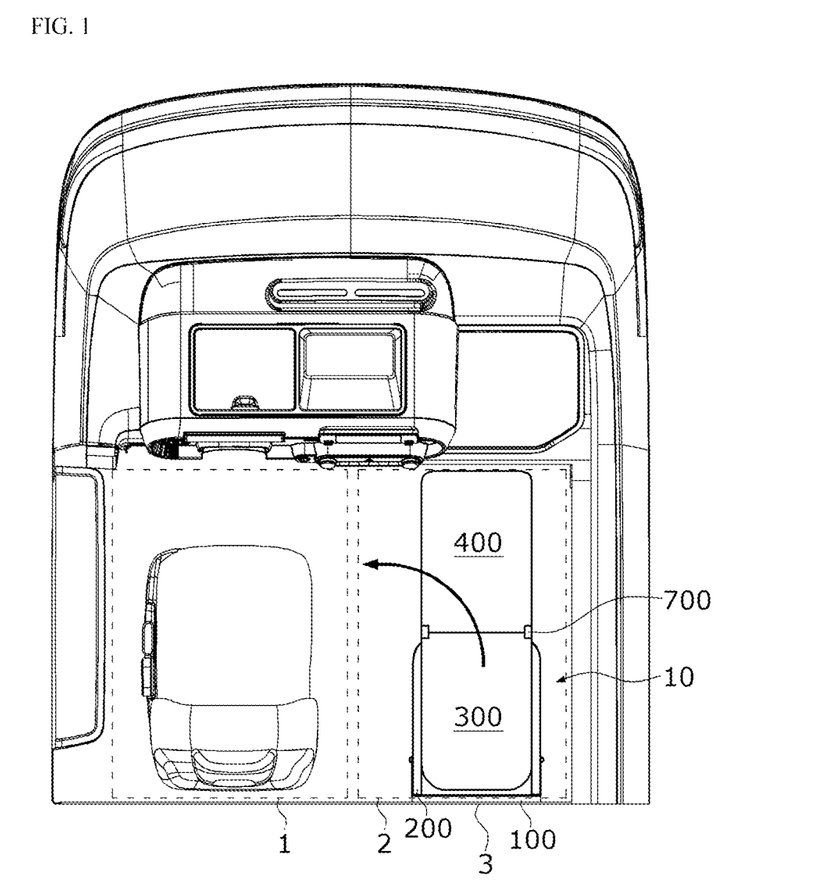
FIG. 1 is a view schematically illustrating a state in which a partition wall for a delivery vehicle according to an embodiment of the present disclosure is deployed in a front passenger seat space.
Figure 2:
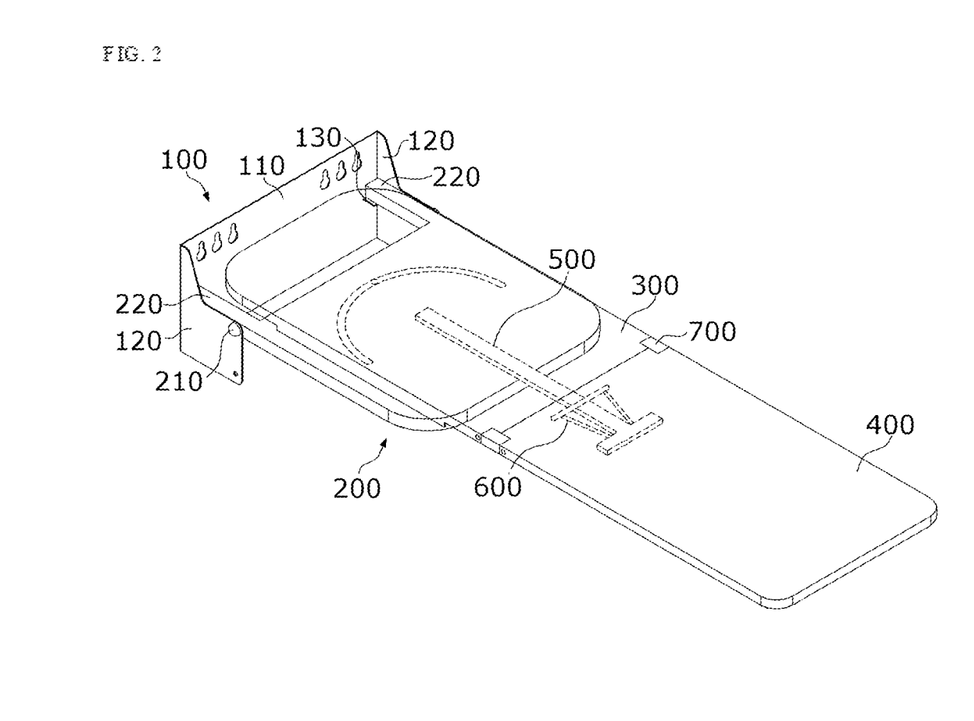
FIG. 2 is a view schematically illustrating the partition wall for a delivery vehicle in FIG. 1.
Figure 3:
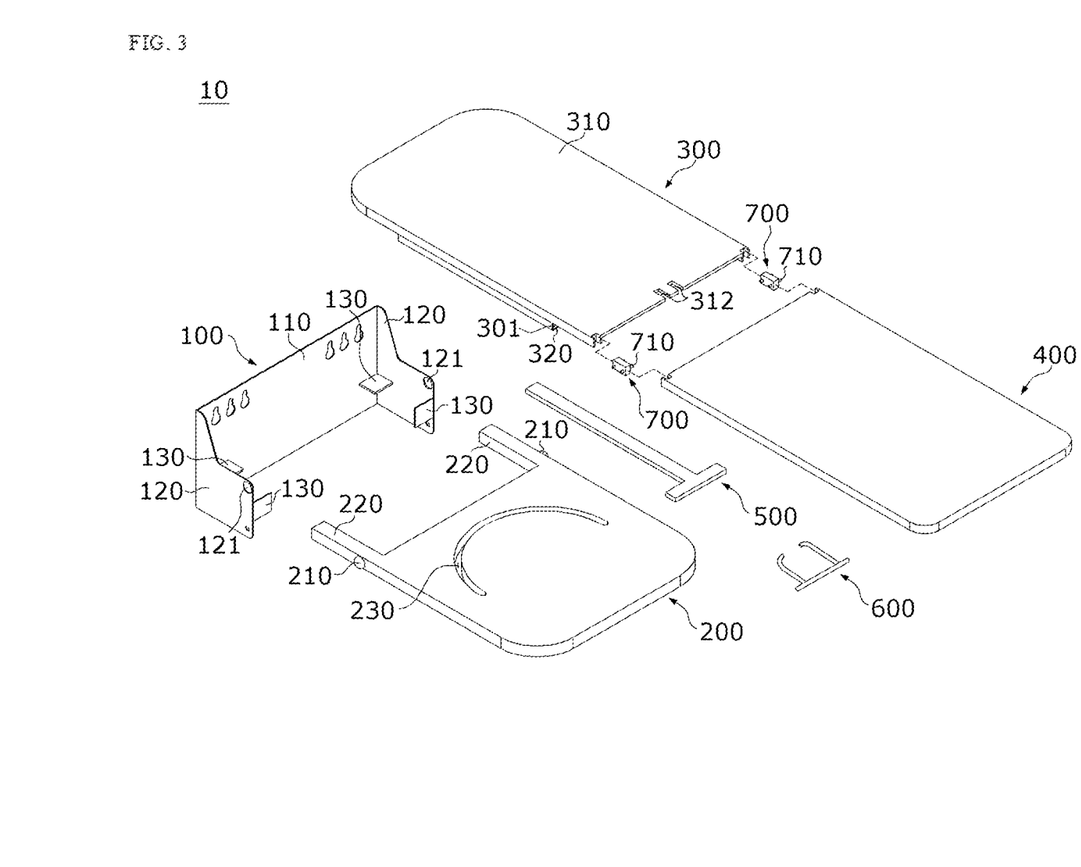
FIG. 3 is a view schematically illustrating a configuration of the partition wall for a delivery vehicle of FIG. 2.
Figure 4:
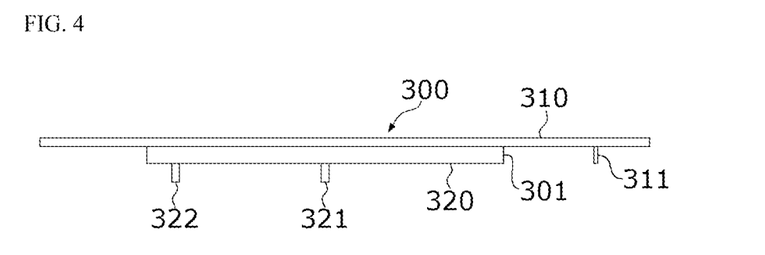
FIG. 4 is a view schematically illustrating a state of a second folding board in FIG. 3 viewed from a side thereof.
Figure 6:
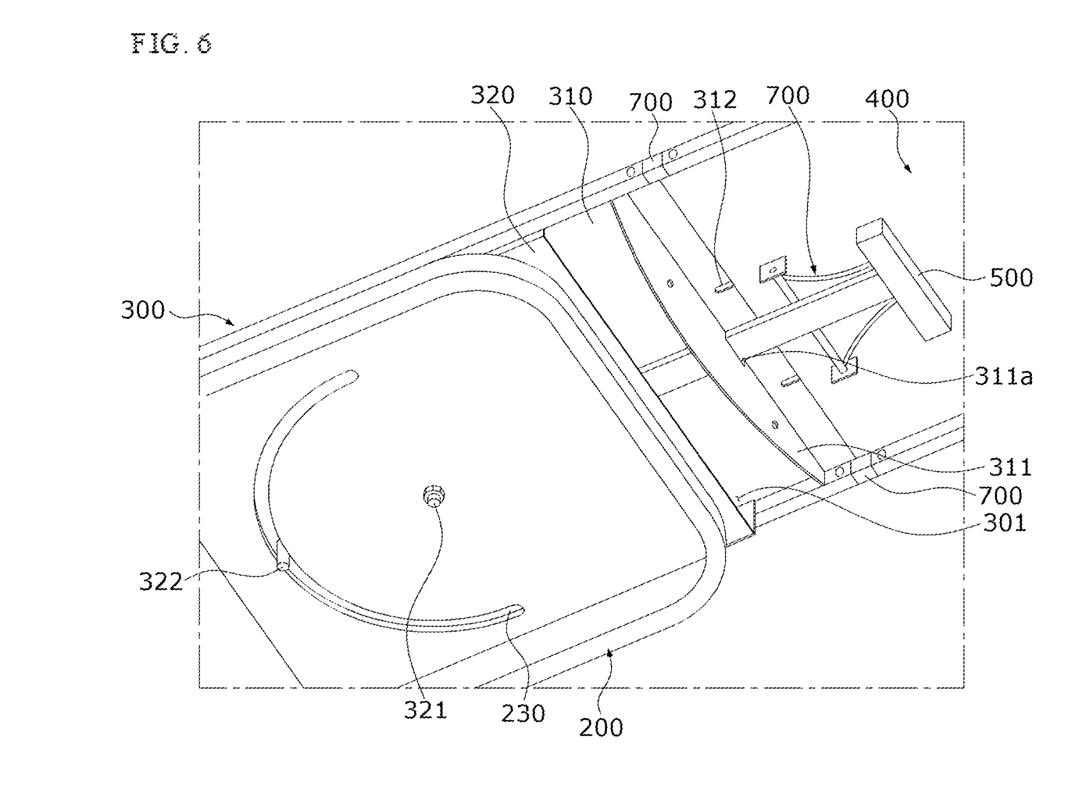
FIG. 6 is a view schematically illustrating a state in which a bridge frame is moved by a withdrawal spring in the partition wall for a delivery vehicle of FIG. 2.
Figure 7A:
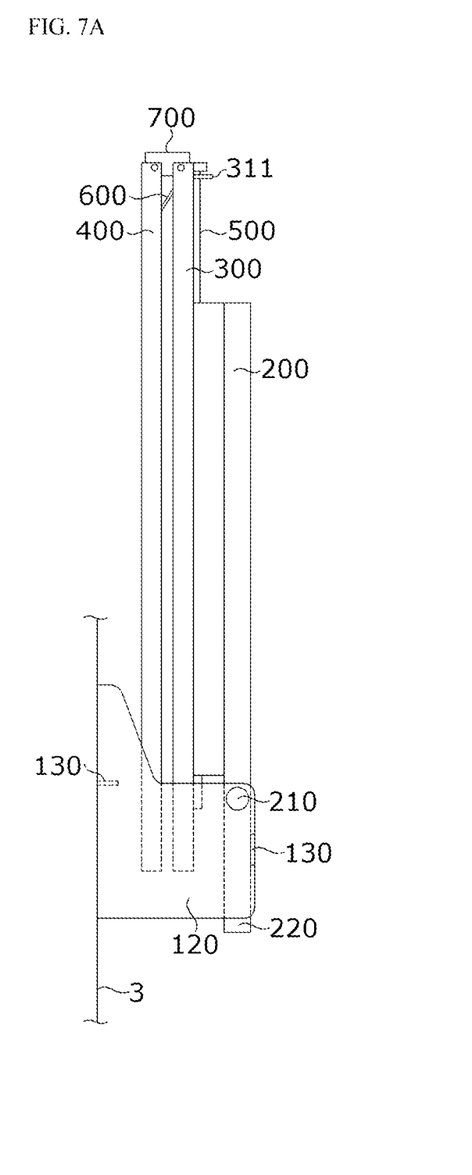
FIGS. 7A to 7D are views schematically illustrating a state in which the partition wall for a delivery vehicle according to the embodiment of the present disclosure is unfolded and deployed.
Figure 7B:
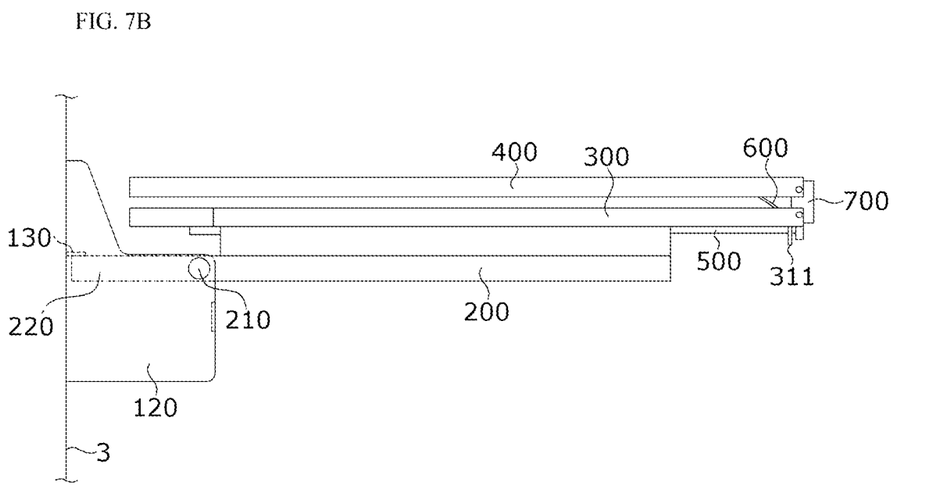
Figure 7C:
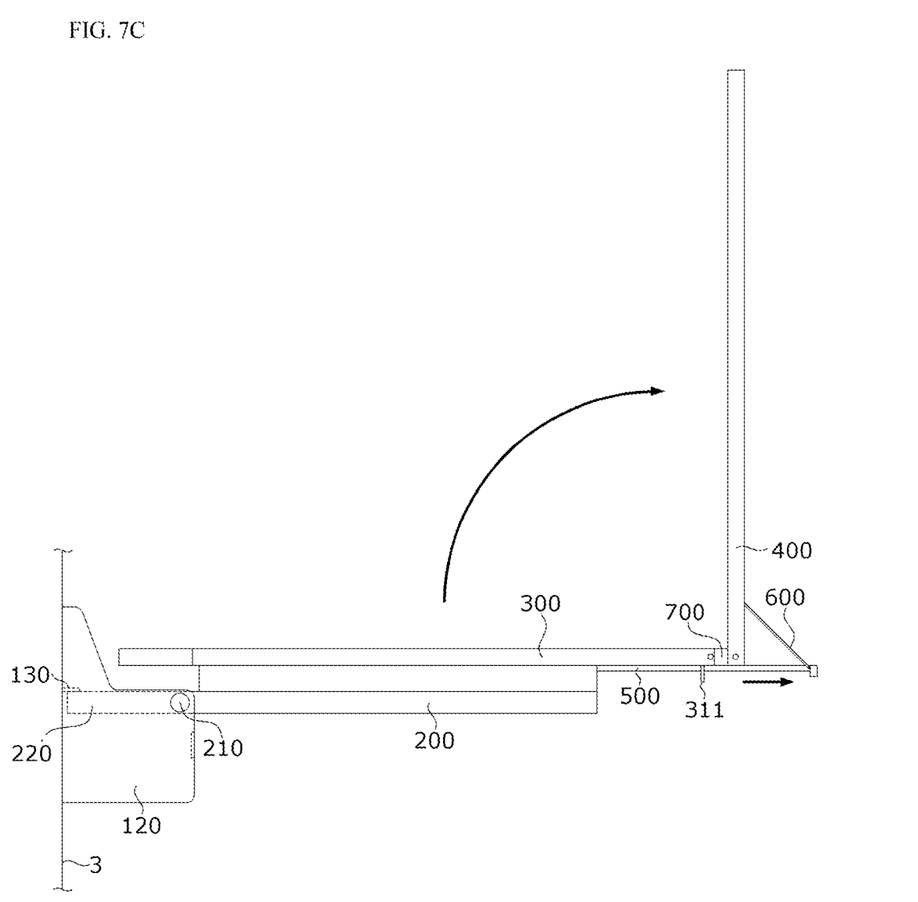
Figure 7D:
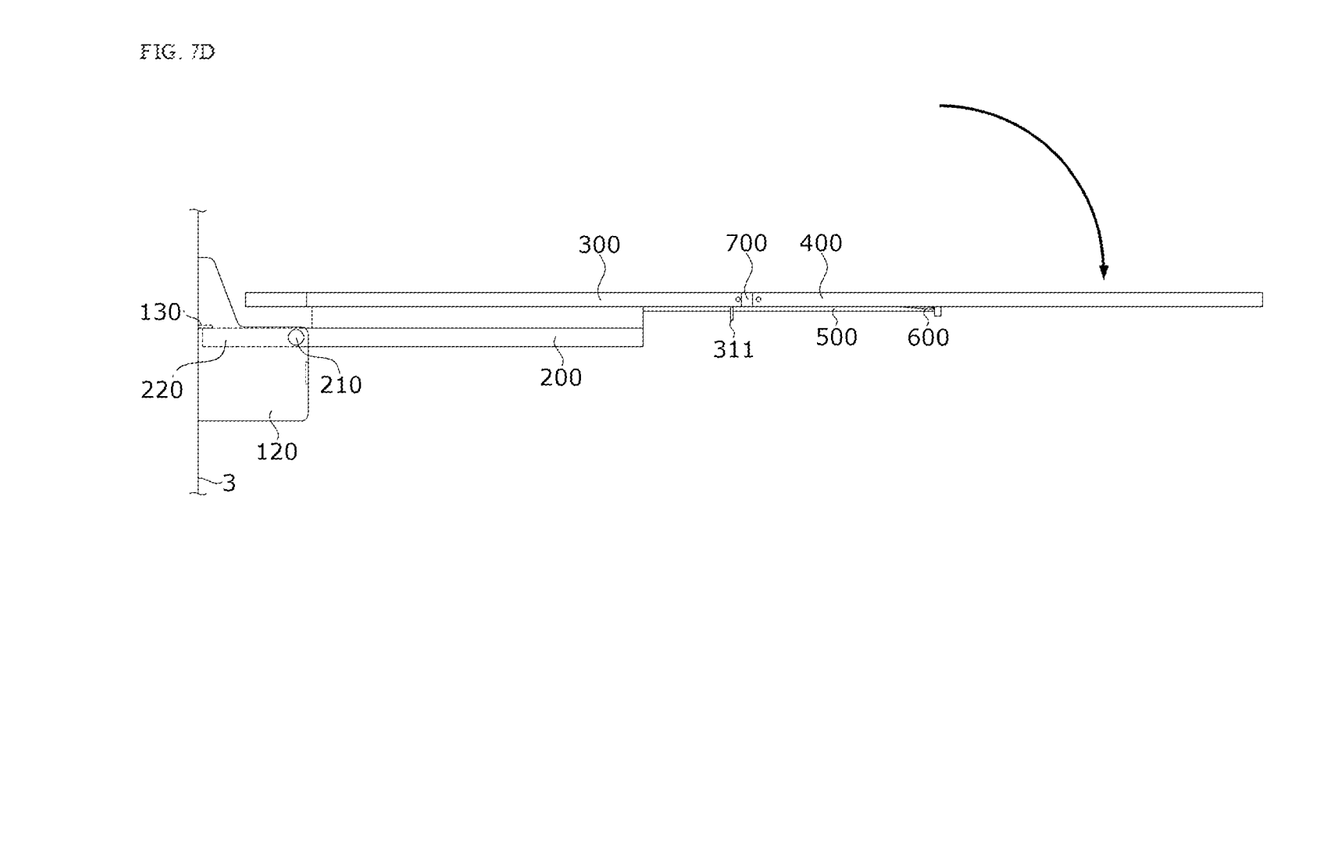
Figure 8:
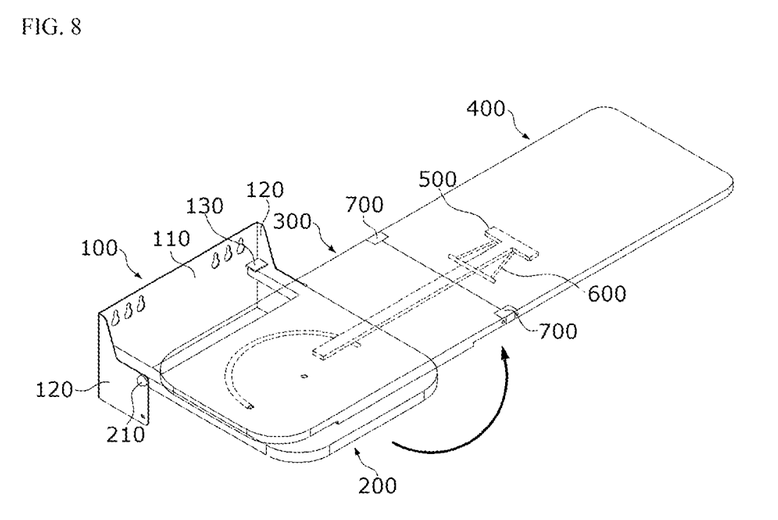
FIG. 8 is a view schematically illustrating a state in which the partition wall for a delivery vehicle in FIG. 2 rotates toward a driver seat space.

FIGS. 1 to 6 are views schematically illustrating the configuration and structure of a partition wall for a delivery vehicle according to an embodiment of the present disclosure, FIGS. 7A to 7D are views schematically illustrating a state in which the partition wall for a delivery vehicle according to the embodiment of the present disclosure is unfolded and deployed, and FIG. 8 is a view schematically illustrating a state in which the partition wall for a delivery vehicle in FIG. 2 rotates toward a driver seat space.

As shown in FIG. 1, a partition wall 10 with a table function for a delivery vehicle according to an embodiment of the present disclosure may be installed in a front passenger seat space 2 with a front passenger seat removed, and deployed in an unfolded state to serve as a partition wall and rotated to a driver seat space 1 to serve as a table. In addition, when necessary, the partition wall 10 may be folded to a rear panel 3 of a cockpit and disposed in close contact in a folded state.

Referring to drawings, the partition wall 10 with the table function for a delivery vehicle according to the embodiment of the present disclosure may include a fixing frame 100, a first folding board 200, a second folding board 300, and a third folding board 400. In addition, according to the embodiment, the partition wall 10 may further include a bridge frame 500 and a withdrawal spring 600.

The fixing frame 100 may be mounted on the rear panel 3 of the cockpit in the front passenger seat space 2 with the front passenger seat removed.

The fixing frame 100 may include a body 110 fixed to the rear panel 3 and a pair of side walls 120 bent at both ends of the body 110 and extending toward the front passenger seat space 2. Accordingly, the fixing frame 100 may have an overall "C"-shaped structure.

A hinge hole 121, to which a hinge shaft 210 of the first folding board 200 is connected, may be formed in each of the side walls 120.

In addition, a stopper 130 restricting a rotation range of the first folding board 200 may be provided to protrude on an inner surface of each of the body 110 and the side walls 120.

The first folding board 200 is rotatably connected to the fixing frame 100 and may be provided to be folded or unfolded toward the fixing frame 100.

Accordingly, the first folding board 200 may be folded and disposed in a folding state of being erected in an up-and-down direction approximately parallel to the body 110. In addition, the first folding board 200 may be disposed in an unfolded state in which the first folding board 200 is unfolded and laid horizontally in a structure orthogonal to the body 110.

The first folding board 200 may have a substantially rectangular structure, and be equipped with the hinge shaft 210 protruding outward and fastened to the hinge hole 121 in the side wall 120 of the fixing frame 100 on each of both side surfaces.

In addition, the first folding board 200 may have a pair of supports 220 extending longitudinally from both edges in the width direction.

Accordingly, when the first folding board 200 rotates about the hinge shaft 210 between the side walls 120, the supports 220 may be obstructed by the stopper 130 provided on each of the body 110 and the side walls 120 of the fixing frame 100, and thus enable the first folding board 200 to maintain the folding state and the unfolding state.

That is, referring to FIG. 7A, when the first folding board 200 rotates between the side walls 120, the supports 220 may be obstructed by the stoppers 130 of the side walls 120 so that the first folding board 200 may no longer rotate and maintain the folding state parallel to the body 110.

In addition, as shown in FIG. 7B, the supports 220 may be obstructed by the stoppers 130 of the body 110 so that the first folding board 200 may no longer rotate and maintain the unfolding state orthogonal to the body 110.

In the embodiment, the supports 220 may be configured such that a distance from the hinge shaft 210 to an end of the supports 220 is shorter than a distance from the hinge hole 121 to the body 110.

The second folding board 300 may be disposed on the first folding board 200 in a state in which the folding board 200 is unfolded. In addition, the second folding board 300 may be rotatably connected on the first folding board 200 (refer to FIG. 8).

As shown in the drawings, the second folding board 300 may include an upper plate 310 with an overall rectangular structure and a lower plate 320 forming an inner space 301 between the lower plate 320 and the upper plate 310.

The upper plate 310 may have a rib 311 protruding toward the lower plate 320 on a lower surface.

The rib 311 may be provided in a structure disposed in front of the inner space 301 with an open front surface and extending along a width direction of the upper plate 310.

An opening 311a which a bridge frame 500 to be descried below penetrates may be formed in the rib 311.

The lower plate 320 may be disposed in a structure placed on an upper surface of the first folding board 200 and contacting the first folding board 200.

The lower plate 320 may have a rotation shaft 321 connected through the first folding board 200 in a state in which the lower plate 320 is placed on the upper surface of the first folding board 200. Accordingly, the second folding board 300 may be rotated clockwise or counterclockwise about the rotation shaft 321 on the first folding board 200.

In addition, the lower plate 320 may have a guide pin 322 protruding toward the first folding board 200 at a location spaced apart from the rotation shaft 321. In this case, a guide hole 230 with a radius being a distance from the rotation shaft 321 to the guide pin 322 may be formed in a partial circular shape in the first folding board 200.

Accordingly, when the second folding board 300 rotates about the rotation shaft 321 with the guide pin 322 inserted into the guide hole 230, the guide pin 322 may move along a rotation trajectory provided by the guide hole 230 and guide the second folding board 300 into stable rotation.

In the embodiment, the guide hole 230 may be formed in a semicircle shape, and the second folding board 300 may be rotated in a range of 180 degrees.

Figure 5:
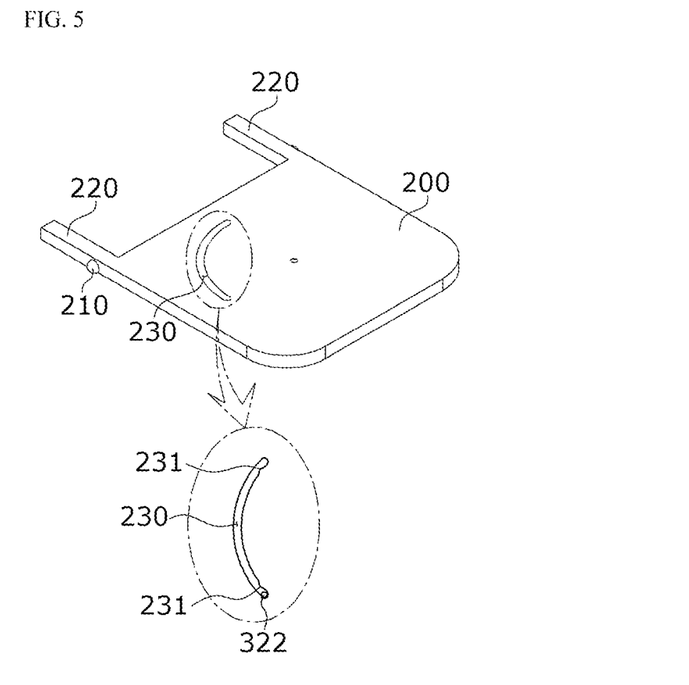
FIG. 5 is a view schematically illustrating a modified example of a guide hole provided in a first folding board in FIG. 3.

In addition, as shown in FIG. 5, the guide hole 230 may be formed in the shape of a half a semicircle, and the second folding board 300 may be rotated in a range of 90 degrees.

Referring to FIG. 5, fixing projections 231 to which the guide pin 322 is hooked and fixed may protrude and be formed at both side ends of the guide hole 230.

When the guide pin 322 moves to one side end of the guide hole 230 and the second folding board 300 is completely rotated toward the driver seat space 1, the fixing projection 231 may restrict the guide pin 322 and thus prevent the second folding board 300 from unintentionally rotating toward the front passenger seat space 2.

In addition, when the guide pin 322 moves to the other side end of the guide hole 230 and the second folding board 300 is completely rotated toward the front passenger seat space 2, the fixing projection 231 may restrict the guide pin 322 and thus prevent the second folding board 300 from unintentionally rotating toward the driver seat space 1.

The third folding board 400 may be rotatably connected to a longitudinal end portion of the second folding board 300. In addition, as shown in FIGS. 7B and 7C, the third folding board 400 may be provided to be folded or unfolded toward the second folding board 300.

The third folding board 400 may have an overall rectangular structure corresponding to the upper plate 310 of the second folding board 300, and be folded on the second folding board 300 to form a stacked structure together with the second folding board 300.

In addition, the third folding board 400 may form a structure extending continuously alongside the second folding board 300 by being unfolded from the second folding board 300. That is, in the unfolding state, the third folding board 400 may be disposed in a structure extending toward the front of the vehicle in the front passenger space together with the second folding board 300.

Thus, in the unfolding state alongside the second folding board 300, the third folding board 400 may be disposed toward the front of the vehicle and thus function as a partition wall between the driver seat space 1 and the front passenger seat space 2 (refer to FIG. 1).

Accordingly, luggage loaded in the front passenger seat space 2 may be prevented from spilling over into the driver seat space 1.

In addition, in the unfolding state alongside the second folding board 300, the third folding board 400 may be disposed toward the driver seat as the second folding board 300 rotates toward the driver seat space 1 and thus function as a table (refer to FIG. 8).

Accordingly, the driver may be provided with various types of convenience including working or eating on the third folding board 400 and the second folding board 300.

Connection hinges 700 connecting the second folding board 300 and the third folding board 400 to be rotatable with each other may be provided between the second folding board 300 and the third folding board 400.

Each of the connection hinges 700 may have a connection shaft 710 at both longitudinal end portions and be connected to the second folding board 300 and the third folding board 400 at both edges in a width direction of the second folding board 300 and the third folding board 400.

Meanwhile, the bridge frame 500 may be provided to be movable forward and backward below the second folding board 300.

As shown in the drawings, the bridge frame 500 may have an overall rod-shaped structure with a "T"-shaped fore-end portion and be disposed in a structure extending along the longitudinal direction of the second folding board 300 below the second folding board 300.

The bridge frame 500 may be held in the inner space 301 in a state in which the third folding board 400 is folded on the second folding board 300. In addition, the bridge frame 500 may be configured to enable the fore-end portion moving forward in the inner space 301 to support the third folding board 400 below the third folding board 400 in a state in which the third folding board 400 is unfolded forward.

That is, the bridge frame 500 moves forward as the third folding board 400 is unfolded below the second folding board 300 to be disposed partially below the third folding board 400, and moves backward as the third folding board 400 is folded to be held in the inner space 301 below the second folding board 300.

Referring to FIG. 6, the bridge frame 500 is connected by passing through the opening 311a of the rib 311 provided on the upper plate 310 of the second folding board 300, and the rib 311 supports the bridge frame 500 through the opening 311a and guides the forward and backward sliding movement of the bridge frame 500.

The withdrawal spring 600 may be connected to the bridge frame 500 and configured to move the bridge frame 500 according to an operation of the third folding board 400.

As shown in FIG. 6, the withdrawal spring 600 may be provided in a structure with one side connected to the third folding board 400 and the other side connected to the fore-end portion of the bridge frame 500.

The bridge frame 500 may be pushed by the withdrawal spring 600 to slide forward on the second folding board 300 as the third folding board 400 rotates and is unfolded, and the fore-end portion of the bridge frame 500 may be disposed below the third folding board 400 in a state in which the third folding board 400 is completely unfolded.

In addition, the bridge frame 500 may be pulled by the withdrawal spring 600 to slide backward on the third folding board 400 as the third folding board 400 rotates and is folded, and the bridge frame 500 may be held in the inner space 301 of the second folding board 300 in a state in which the third folding board 400 is completely folded.

The location of the fore-end portion according to the movement of the bridge frame 500 may be determined by a length of the withdrawal spring 600.

In the embodiment, a receiving groove 312 may be provided in the upper plate 310 of the second folding board 300 to receive the withdrawal spring 600 in a state in which the third folding board 400 is folded.

The receiving groove 312 may be provided in a slot shape at the end portion of the upper plate 310 facing the third folding board 400.

As described above, according to the embodiment of the present disclosure, the first folding board 200, the second folding board 300, and the third folding board 400, which constitute a partition wall structure, are provided foldably and thus may prevent luggage loaded in the front passenger seat space 2 from spilling over into the driver seat space 1 when unfolded toward the front passenger seat space 2.

In addition, when luggage has a large size and the partition wall 10 needs to be removed to secure the front passenger seat space 2, simply folding of the partition wall 10 toward the rear panel 3 of the cockpit may easily and conveniently realize the effect of removing the partition wall 10.

In addition, when unfolded, the first folding board 200, the second folding board 300, and the third folding board 400 may rotate toward the driver seat space 1 and be used as a table. Accordingly, there is an advantage in that the existing inconvenience of having and installing a separate table is eliminated.

According to an embodiment of the present disclosure, a partition wall with a table function for a delivery vehicle capable of loading luggage with various sizes in a front passenger seat space by configuring the partition wall installed in the front passenger seat space as a foldable structure and providing convenience of use to a driver by giving the table function can be provided.

The effects of the present disclosure are not limited to the above-mentioned effects, and other effects not mentioned will be clearly understood by those skilled in the art from the appended claims.

It will be apparent to those skilled in the art that various modifications can be made to the above-described exemplary embodiments of the present disclosure without departing from the spirit or scope of the invention. Thus, it is intended that the present disclosure covers all such modifications provided they come within the scope of the appended claims and their equivalents.

What is claimed is:

1. A partition wall for a delivery vehicle, the partition wall comprising:
    a fixing frame mounted on a rear panel of a cockpit in a space with a front passenger seat removed;
    a first folding board rotatably connected to the fixing frame and provided to be folded or unfolded toward the fixing frame;
    a second folding board disposed on the first folding board when the first folding board is unfolded, and rotatably connected to the first folding board;
    a third folding board rotatably connected to an end portion of the second folding board and provided to be folded or unfolded toward the second folding board; and
    a withdrawal spring with one side connected to the third folding board and the other side connected to a fore-end portion of a bridge frame provided to be movable forward and backward below the second folding board.

2. The partition wall of claim 1,
    wherein the bridge frame slides forward on the second folding board by the withdrawal spring as the third folding board is unfolded so that the fore-end portion is disposed below the third folding board.

3. The partition wall of claim 2, wherein the second folding board includes an upper plate and a lower plate forming an inner space between the lower plate and the upper plate, and the bridge frame is held in the inner space when the third folding board is folded, and the fore-end portion moving forward in the inner space supports the third folding board when the third folding board is unfolded.

4. The partition wall of claim 3, wherein the lower plate has a rotation shaft connected through the first folding board when the lower plate is placed on an upper surface of the first folding board.

5. The partition wall of claim 4, wherein the lower plate has a guide pin protruding toward the first folding board at a location spaced apart from the rotation shaft, a guide hole with a radius being a distance from the rotation shaft to the guide pin is formed in a partial circular shape in the first folding board, and the guide pin is configured to move along a rotation trajectory provided by the guide hole when the second folding board rotates about the rotation shaft with the guide pin inserted into the guide hole.

6. The partition wall of claim 5, wherein fixing projections to which the guide pin is hooked and fixed protrude and are formed at both ends of the guide hole.

7. The partition wall of claim 3, wherein the upper plate has a rib protruding toward the lower plate on a lower surface, and an opening that the bridge frame penetrates is formed in the rib to guide a sliding movement of the bridge frame.

8. The partition wall of claim 1, further comprising: connection hinges connecting the second folding board and the third folding board to be rotatable with each other, each of the connection hinges is connected to the second folding board and the third folding board at both edges in a width direction of the second folding board and the third folding board.

9. The partition wall of claim 1, wherein the fixing frame includes a body fixed to the rear panel and a pair of side walls bent at both ends of the body and extending toward the space, a hinge hole to which a hinge shaft of the first folding board is connected is formed in the side walls, and a stopper restricting a rotation range of the first folding board is provided to protrude on an inner surface of each of the body and the side walls.

10. The partition wall of claim 9, wherein the first folding board has a pair of supports extending longitudinally from both edges in a width direction, and when the first folding board rotates about the hinge shaft, the supports are obstructed by the stopper provided on each of the body and the side walls so that the first folding board maintains a folding state and an unfolding state.

11. The partition wall of claim 10, wherein a distance from the hinge shaft to an end of each of the supports is shorter than a distance from the hinge hole to the body.

* * * * *